(No Model.)
S. P. GRAHAM.
COMBINED BORING TOOL AND HOLDER.
No. 339,544. Patented Apr. 6, 1886.
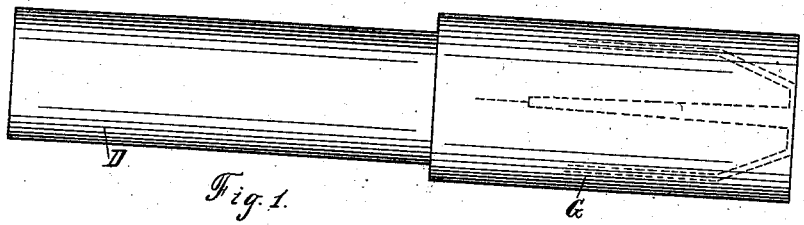
Fig. 1.
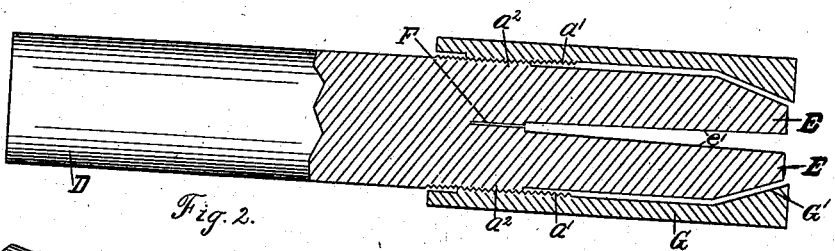
Fig. 2.
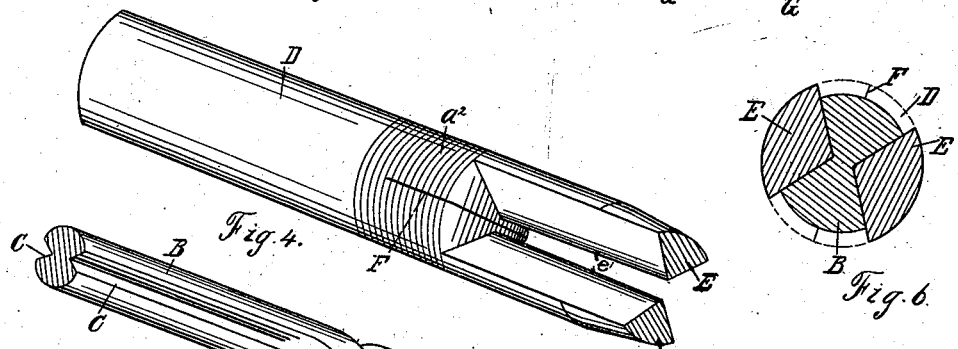
Fig. 4.
Fig. 5.
Fig. 3.
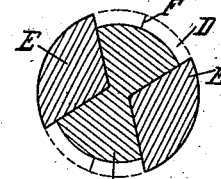
Fig. 6.
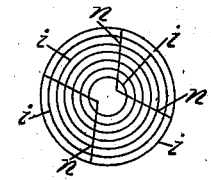
Fig. 7.
Witnesses
A. Edmunds
Carl Hayden
Inventor
Simon Peter Graham
By P. J. Edmunds
Attorney

UNITED STATES PATENT OFFICE.

SIMON PETER GRAHAM, OF GALT, ONTARIO, CANADA.

COMBINED BORING-TOOL AND HOLDER.

SPECIFICATION forming part of Letters Patent No. 339,544, dated April 6, 1886.

Application filed July 14, 1885. Serial No. 171,628. (No model.)

*To all whom it may concern:*

Be it known that I, SIMON PETER GRAHAM, a citizen of the United States, and a resident of the town of Galt, in the county of Waterloo, in the Province of Ontario, in the Dominion of Canada, machinist, have invented certain new and useful Improvements in Combined Drill and Bit Shanks and Holders, of which the following is a specification.
This invention relates to improvements on shanks of drills for boring iron, or shanks of bits for boring wood, or any boring-tool where a holder is required to hold it while rotating same; and this invention consists of a drill or wood-bit in the shank of which two grooves are formed, to which grooves the jaws or prongs of the holder are fitted, so as to hold said drill or bit while it is being rotated.

The object of this invention is to form two grooves in a drill or wood-bit shank, and adapt the adjacent jaws or prongs of a holder to fit the same, so that the jaws or prongs in one holder will fit the grooves in drills of various sizes, reference being had to the accompanying drawings, wherein—

Figure 1 is a side elevation of a holder embodying my invention. Fig. 2 is another view of same, partly in section. Fig. 3 is a perspective view of same, with the sleeve removed and a drill-shank inserted between the jaws thereof. Fig. 4 is a perspective view of my improved holder, showing the jaws or prongs. Fig. 5 is a perspective view of a drill, showing the grooves in the shank, to which are fitted the jaws or prongs of the holder. Fig. 6 is a cross-sectional view on the line $x$ $x$ of Fig. 3. Fig. 7 represents drills of various sizes adapted to be held by one holder, as the metal between the grooves in the small drill is the same thickness as in the drill of a larger size, in each of which the angle of the groove is the same, thereby enabling the holder to firmly hold a large number of drills of various sizes.

A designates a drill, in the shank B of which two grooves, C C, are formed, which, with the grooves in the cutting part of the drill, form a groove from end to end throughout the entire length of the drill, for the purposes hereinafter mentioned. These grooves may be angular, circular, or any other suitable shape; but the most satisfactory results have been obtained when constructed angular, as shown in Fig. 5 of accompanying drawings.

D designates a holder formed with prongs or jaws E E, the adjacent faces of which are fitted to correspond with the grooves C C in the drill-shank B. In the body of holder D, beyond the jaws or prongs E E, the slit F is formed to permit it to spring or give a little when the jaws E E are being clamped to the drill-shank B by the sleeve G.

G is a sleeve, which is screw-threaded a short distance on its inner face, at $a'$, to correspond with a screw-thread, $a^2$, on the body of the holder D. On the inner face of the sleeve G, near the outer end, an inclined flange, G', is formed, which is fitted to the beveled outer end of the prongs or jaws E E, so that when said sleeve G is screwed up this inclined flange binds on the beveled outer ends of the prongs or jaws E E, and compresses them into the grooves C C in the drill-shank B, to rigidly and firmly secure the drill A in the holder D.

In Fig. 7 of annexed drawings, the circles $i$ $i$ represent a graduation of different-sized drills, with the angular shape of the jaws or prongs E E of the holder marked across them at $n$ $n$, to show that a small as well as a large size of drill may be rigidly, securely, and firmly held in the same holder. The inner edges, $e'$, of the prongs or jaws E E are slightly tapering toward the body of the holder D, for the purpose of allowing for slight variations in the forming of the grooves in the drill or wood-bit shank.

The drill or wood-bit being grooved from end to end, as hereinbefore described, it yields to the straightener-rolls, so that the drill may be accurately sized and straightened under one operation, thereby requiring less time and less labor to manufacture a drill or wood-bit; and this invention is more economical under the rolling process than under the process where the drills are milled and the shanks turned, for by rolling the grooves in the drill and shank of same lengthwise the steel is elongated, so that a drill is constructed from a much less quantity of material.

The drills rolled and straightened with solid shanks cannot be accurately sized without first sizing the solid part of the shank of the drill in a separate roll, as round-bar steel varies in size in cross-section, and does not yield or reduce when rolled transversely or in the direction of its circumference.

The advantage of providing this holder D with prongs or jaws E E, in combination with drills A, or wood-bits in which grooves C C are formed, as hereinbefore described, is that at least twice the number of different-sized drills may be held by one of these holders than can be held by one of any other holder or socket in present use, and this holder is of extremely small diameter, which is of great advantage to the mechanical working of the drill in confined positions.

This holder may be attached to a drill-press or lathe by simply turning the blank end of the holder to fit the spindles of said drill-press or lathe.

Having thus fully described my invention, what I claim as new therein, and desire to secure by Letters Patent, is—

1. A drill or wood-bit shank, B, in which two grooves, C C, are formed throughout its entire length, for the purpose specified.

2. A drill or wood-bit, A, in which two grooves, C C, are formed throughout its entire length, substantially as shown and described, and for the purpose specified.

3. A drill or wood-bit shank, B, in which two grooves, C C, are formed, the metal between the two grooves C C being of one thickness in many different sizes of drills, substantially as shown and described, and for the purpose set forth.

4. A holder, D, formed with jaws or prongs E E, substantially as shown and described, and for the purpose set forth.

5. The combination of a drill-shank, B, in which grooves C C are formed, with the holder D, formed with prongs or jaws E E, and sleeve G, substantially as shown and described, and for the purpose specified.

In testimony whereof I affix my signature in the presence of the two undersigned witnesses.

SIMON PETER GRAHAM.

Witnesses:
  P. J. EDMUNDS,
  A. EDMUNDS.